UNITED STATES PATENT OFFICE.

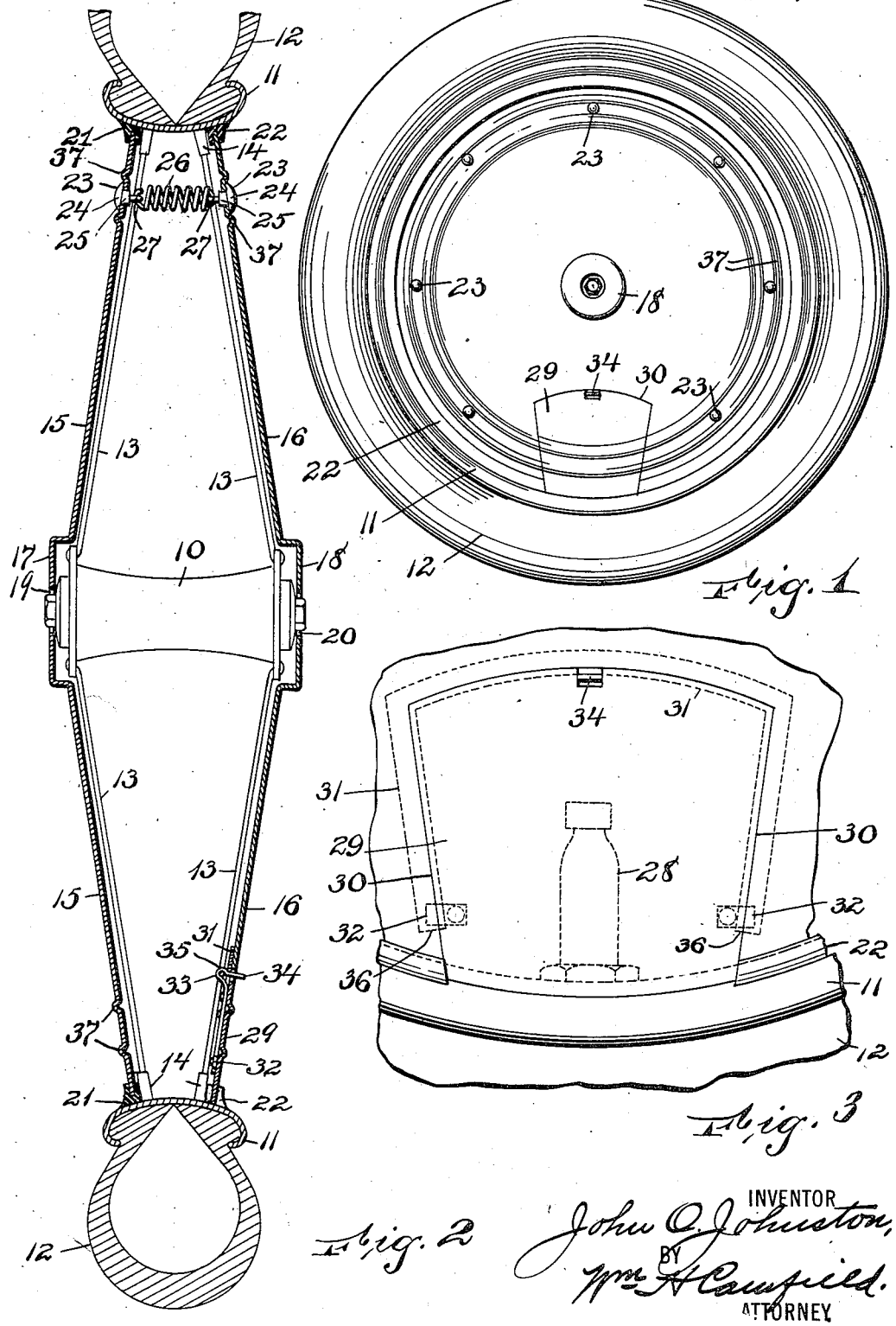

JOHN O. JOHNSTON, OF NEWARK, NEW JERSEY, ASSIGNOR TO THE J. J. DISC-WHEEL CORPORATION, OF NEWARK, NEW JERSEY, A CORPORATION OF NEW JERSEY.

GUARD FOR WHEELS.

1,373,889.   Specification of Letters Patent.   Patented Apr. 5, 1921.

Application filed January 28, 1919. Serial No. 273,574.

*To all whom it may concern:*

Be it known that I, JOHN O. JOHNSTON, a citizen of the United States, and a resident of Newark, county of Essex, and State of New Jersey, have invented certain new and useful Improvements in Guards for Wheels, of which the following is a specification.

This invention relates to an improved guard or covering for a wheel, and is particularly adapted for wheels that have wire spokes and substantially broad hubs, such as are used on motor-cycles, aeroplanes, automobiles and the like, the illustration, however, showing the guard as applied to a wheel of the type used on motor-cycles.

The device consists of two plates that are designed to be applied to the opposite sides of the wheel and to fit against the rim and to be a substantially close fit around the hub, these plates or disks being held together by means that permit of an easy detachment of the disks. The device is also adapted to permit access to the valve of the pneumatic tire, so that it is not necessary to remove the whole device in order to get at the valve.

The invention covers the spokes and the hub and that part of the rim that is engaged by the spokes, thereby preventing access of the weather to the spokes, this being desirable, since the loosening and the loss of spokes is due largely to moisture and dirt that settle on the spokes.

The device also forms a protection for the spokes so that it is not necessary to use a spoke guard such as is now used on motor-cycles, as the present device effectively protects the spokes and prevents the insertion of any element between the spokes, as will be apparent.

The invention is illustrated in the accompanying drawing, in which Figure 1 is a side view of a wheel having my improved device attached thereto. Fig. 2 is a central vertical section of Fig. 1, and Fig. 3 is a side view of one form of opening in one of the plates or disks to permit access to the air valve of the tire. It will, of course, be evident that different forms of wheels can be provided with the present invention, small details being changed to meet each particular type of wheel, although in the usual form of motor-cycle or automobile wheel a form of disk is employed that will fit most wheels without any material change.

In the illustration a motor-cycle wheel is illustrated consisting of a hub 10 and a rim 11, the rim carrying a tire 12 and being connected to the hub by wire spokes 13, these wire spokes being fastened to the rim by suitable securing means 14, these being of different types but usually consisting of a threaded thimble, and these thimbles, when subjected to water and to the weather incidental to use outdoors on roads, become damaged and broken, necessitating frequent repairs to the wheel.

The guard consists of two members 15 and 16, each of which is suitably formed adjacent to the hub to approximately fit the hub, in the form shown the members being formed into bosses 17 and 18, respectively, having perforations 19 and 20, although this particular form is not essential and any configuration at this point that will form a substantial closure can be utilized. These members 15 and 16 are preferably made of sheet metal and are substantially rigid and are usually formed to approximately conform to the outer shape of the wheel within the rim.

The members fit against the inner face of the rim, preferably by resilient means, the form shown embracing the rings 21 and 22 which, as shown, are provided on their inner faces with a groove which fits over the peripheral edge of the members 15 and 16, their elasticity holding them in place on the members or disks 15 and 16 and being adapted, when the members are in place, for being tightly squeezed against the inner faces of the rim to form a substantially tight closure that will exclude water, mud and dust. The members are held in place by suitable detachable connecting means connecting the two members, and I have devised a form of fastening that permits a quick and secure fastening of the members to one end and thereby to the wheel, said means also permitting a substantially quick detachment when such is considered necessary.

One form is illustrated in the drawing, which consists of studs 23 placed at suitable intervals in openings in the members 15 and 16, these studs having heads 24 and reduced portions 25, these being connected by springs 26, each spring being adapted to be attached to a stud 23 by means of an eyelet 27 on each, which will be clearly seen from Fig. 2.

The manner of attaching the members to the wheels and of the securing means to the members is to place one stud 23 in place with a spring 26 attached thereto at one end, and then a bent wire or a suitable screw is inserted to catch the other end of the spring and pull it out partly through the opening in the opposite member to catch the eyelet 27 over the end of the spring, thus partially pulled through, and then permit the second stud to be snapped into place. If desired, the spring 26 can be made small enough in diameter to pass through the openings in which the studs 23 are seated, and in this way the spring can have its end well pulled through the hole in which the second stud is to be seated, although I prefer to use the larger diameter of spring on account of its longer life and increased ability.

To provide access to the air valve 28 I prefer to provide a closure that will permit access to the valve without removing the disks from the wheel, and in the form shown this closure is in the form of a small door or cover 29 which fits into an opening in one of the disks or members, in the illustration the member 16 being the one that is provided with the closure or door, and the opening 30 into which the door or cover 29 fits is more narrow at its outer end than at its inner end and is provided with a stop piece 31 against which the closure 29 is seated, so that the outer faces of the door and the disk are substantially flush, giving a neat and inconspicuous appearance. The lower part of the door is held in place by means of fingers 32 which engage the inner faces of the stop piece 31, and at the top a suitable spring 33 is inserted having a projecting finger piece 34, the portion 35 of the spring being adapted to engage the inner top edge of the stop 31 to hold the plate or cover 29 in position.

When the cover is to be removed the finger piece 34 is operated to release the spring 33, and a slight outward pull on the top edge of the closure 39 and an inward push on the bottom tilts it enough to permit it to be slid inward toward the hub of the wheel until the outer edges of the fingers 32 clear the widened inner end of the stop piece 31, and the closure 29 can then be completely removed from the disks. The initial pulling to which the cover 29 is subjected to permit its being slid inward toward the hub is possible because the outer ends of the stop piece 31 are cut away, as at 36, to permit such pulling.

When the closure 29 is to be put back into place the operation is reversed and the fingers 32 are placed behind the stop piece 31 at the inner end of the opening 30, and then the door 29 is swung outward to its limit of movement and the top slightly pressed in to permit the spring 33 to engage the stop 31, and the door is then held in place without rattling and without any substantial opening present for the admission of water, mud or dust. The disks or members 15 and 16 can be strengthened by suitable ribs, in the form shown these being circular ribs 37.

The device is simple and is easily attached and detached and does not necessitate any securing means attached to the wheel to wear thereon or to disfigure it in any way and the device can be cheaply made and is composed of but few parts.

I claim:

1. A guard for wheels comprising members fitting against the rim of the wheel and covering opposite sides of the wheel within the rim, studs fitting in alined openings in said members and covering the openings, and springs connecting the studs and detachably secured to at least one of each pair of alined stubs.

2. A guard for wheels comprising a pair of members adapted to fit within the rim on opposite sides of the wheel, resilient rings fitting between the members and the rim, and means for holding the members in place.

3. A guard for wheels comprising a pair of members adapted to fit within the rim of a wheel and on opposite sides thereof, annular resilient rings fitting between the members and the rim, and fastening means for holding the members and their rings in position, said means being placed between and concealed by the members.

4. A guard for wheels comprising a pair of sheet metal members conforming approximately to the shape of the wheel within the rim, headed studs arranged in alined pairs, and springs secured at their ends to each pair of studs to draw said studs toward each other and thus hold the members in position.

5. A guard for wheels comprising a member to fit against one side of the wheel, said member having an opening in its edge, said opening being wider at its inner end than at its outer end, a closure shaped to fit the opening and having means for engaging the inner face of the member at the outer end of the opening, and being narrower than the inner end of the opening, whereby it can be withdrawn, and a stop against which the closure rests when in place.

6. A guard for wheels comprising a member to fit against one side of the wheel, said member having an opening in its edge, said opening being wider at its inner end than at its outer end, a closure shaped to fit the opening and having means for engaging the inner face of the member at the outer end of the opening, and being narrower than the inner end of the opening, whereby it can be withdrawn, a stop against which the closure rests when in place, and a fastening means for holding the closure in place.

In testimony that I claim the foregoing, I have hereto set my hand, this 25th day of January, 1919.

JOHN O. JOHNSTON.